(12) United States Patent
Zhamu et al.

(10) Patent No.: US 11,142,459 B2
(45) Date of Patent: Oct. 12, 2021

(54) DENSE GRAPHENE BALLS FOR HYDROGEN STORAGE

(71) Applicant: Nanotek Instruments, Inc., Dayton, OH (US)

(72) Inventors: Aruna Zhamu, Springboro, OH (US); Song-Hai Chai, Dayton, OH (US); Bor Z. Jang, Centerville, OH (US)

(73) Assignee: Nanotek Instruments Group, LLC, Dayton, OH (US)

( * ) Notice: Subject to any disclaimer, the term of this patent is extended or adjusted under 35 U.S.C. 154(b) by 371 days.

(21) Appl. No.: 16/374,176

(22) Filed: Apr. 3, 2019

(65) Prior Publication Data

US 2020/0317524 A1 Oct. 8, 2020

(51) Int. Cl.
*C01B 32/192* (2017.01)
*C01B 32/198* (2017.01)
*C01B 32/225* (2017.01)
*B82Y 30/00* (2011.01)
*B82Y 40/00* (2011.01)

(52) U.S. Cl.
CPC .......... *C01B 32/192* (2017.08); *C01B 32/198* (2017.08); *C01B 32/225* (2017.08); *B82Y 30/00* (2013.01); *B82Y 40/00* (2013.01)

(58) Field of Classification Search
CPC ... C01B 32/192; C01B 32/198; C01B 32/225; C01B 32/182; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/23; B82Y 30/00; B82Y 40/00
See application file for complete search history.

(56) References Cited

U.S. PATENT DOCUMENTS

| | | |
|---|---|---|
| 7,071,258 B1 | 7/2006 | Jang et al. |
| 2005/0271574 A1 | 12/2005 | Jang et al. |
| 2008/0048152 A1 | 2/2008 | Jang et al. |

OTHER PUBLICATIONS

An, et al., The best addition of graphene of LiMn0.7Fe0.3P04/C cathode material synthesized by wet ball milling combined with spray drying method, Journal of Alloys and Compounds 2018; 767: 315-322 (Year: 2018).*

(Continued)

*Primary Examiner* — Daniel C. McCracken (57) ABSTRACT

Provided is a powder mass of multiple porous graphene balls, wherein at least one of the porous graphene balls comprises multiple graphene sheets having a catalyst, in a form of nanoparticles or coating having a diameter or thickness from 0.3 nm to 10 nm, bonded to or supported by graphene sheet surfaces, wherein the porous graphene balls have a density from 0.01 to 1.7 g/cm$^3$ (preferably and typically from 0.1 to 1.5 g/cm$^3$), and a specific surface area from 50 to 3,000 m$^2$/g (preferably and typically from 200 to 2,630 m$^2$/g). A method of producing such porous graphene balls is provided as well. Also provided is a gas storage device containing the invented powder mass as a gas-absorbing, gas-adsorbing, gas-capturing, or gas-storing medium to store a gas species therein.

23 Claims, 4 Drawing Sheets

(56) References Cited

OTHER PUBLICATIONS

Choi, et al., Fe3O4-decorated hollow graphene balls prepared by spray pyrolysis for ultrafast and long cycle-life lithium ion batteries, Carbon 2014; 79: 58-66 (Year: 2014).*
Hummers et al., "Preparation of graphitic oxide" J. Am. Chem. Soc. (1958) vol. 80, p. 1339.

* cited by examiner

DENSE GRAPHENE BALLS FOR HYDROGEN STORAGE

FIELD

The present disclosure relates generally to the field of gas storage and, more particularly, to densely packed, catalyst-loaded graphene balls for hydrogen storage for fuel cell applications and a process for producing same.

BACKGROUND

A major drawback in the utilization of hydrogen-based fuel cells for powering vehicles is the lack of an acceptable lightweight and safe hydrogen storage medium. Four conventional approaches to hydrogen storage are currently in use: (a) liquid hydrogen, (b) compressed gas, (c) cryo-adsorption, and (d) metal hydride storage systems. A brief description of these existing approaches is given below:

(a) The liquid hydrogen storage approach offers good solutions in terms of technology maturity and economy, for both mobile storage and large-volume storage systems with volumes ranging from 100 liters to 5000 m$^3$. However, the containers (dewar) for storing the liquefied hydrogen are made of very expensive super-insulating materials.

(b) The compressed gas storage approach is usually applied in underground supply systems, similar to a network of natural gas pipelines. This is an economical and simple approach, but it is unsafe and not portable. Compressed hydrogen gas in a large steel tank could be an explosion hazard.

(c) The cryo-adsorbing storage approach involves moderate weight and volume. In this approach, hydrogen molecules are bound to the sorbent only by physical adsorption forces, and remain in the gaseous state. The adsorbing temperature is in the range from 60° K to 100° K.

Activated carbon is commonly used as the sorbent due to its large number of small pores serving as hydrogen storage sites. The efficiency of H$_2$ uptake is no more than 7 wt %, which is equivalent to about 20 kg H$_2$ per cubic meter of activated carbon. The disadvantages of this approach are related to the low capacity and the cryogenic temperature required, which makes it necessary to use expensive super-insulated containers.

(d) The metal hydrides can store large quantities of H$_2$ via a chemical reaction of H+M↔M−H, wherein M is a selected metal element. Two major metal systems, i.e. Fe—Ti and Mg—Ni, have been applied as hydrogen storage media and have been put into use in automobiles driven by a H$_2$/O$_2$ fuel cell. The operating temperature is 40-70° C. for the Ti—Fe system and 250~350° C. for the Mg—Ni system. The hydrogen storage capacity is less than 5 wt % for Ni—Mg and 2 wt % for Fe—Ti, which corresponds to less than 70 kg H$_2$ per m$^3$ of metals. Furthermore, metal hydride systems normally require 20~40 bar pressure to keep the hydrogen in equilibrium. This renders the container for the metal hydride too heavy and expensive, and limits the practical exploitation of these systems for portable electronic and mobility applications.

The above review indicates that the hydrogen storage technology still has four major barriers to overcome: (1) low H$_2$ storage capacity, (2) difficulty in storing and releasing H$_2$ (normally requiring a high T and/or high P), (3) high costs, and (4) potential explosion danger. A need exists for the development of a new high-capacity medium that can safely store and release hydrogen at near ambient temperature conditions. If high pressures are involved in storing hydrogen, the conditions must still be safe.

More recently, researchers have expressed great interest in storing H$_2$ in nanostructured carbon materials. Graphene, a one-atom-thick two-dimensional single layer of sp$^2$-hybridized carbon, has attracted considerable attention for hydrogen adsorption storage, due to its unique physical and chemical properties such as low weight, good mechanical stability, high surface area, large surface-to-volume ratio, and tunable surface chemical functionality. Adsorption of hydrogen on pristine graphene surface proceeds mainly via physisorption by van der Waals forces, leading to a low H$_2$ binding energy (4~10 kJ/mol) and, consequently, a low H$_2$-adsorption storage capacity at or near ambient conditions. To boost the storage capacity for practical application, both theoretical and experimental research has been conducted extensively in the past decade by improving the H$_2$ binding energy through surface-decorating and doping of graphene structures with alkali, alkaline earth, and transition metals.

It is known that pristine graphene, diazonium- and MWCNTs-functionalized graphene generally exhibit an appreciable amount of H$_2$ uptake (<4.0 wt %) only at extremely low temperature (e.g., −196° C.) or high pressure (e.g., 100 bar). Graphene decorated with alkali, alkaline earth, and early transition metals has been predicted by numerous theoretical studies to have enhanced H$_2$ storage capacities, e.g., 12-13 wt % for Li, 5.6 wt % for Mg, 8.4 wt % for Ca, 9 wt % for Sc, 7.9 wt % for Ti, and 7.5 wt % for V. However, the decorated metal atoms on graphene surface are subject to structural instability and poor reversibility in atomic dispersion (i.e., aggregation and clustering, instead of atomic dispersion, occur inevitably as a result of large cohesive energy of bulk metals), along with a great tendency to form a passivating oxide layer. These lead to unexpected low H$_2$ storage capacities, e.g., <1 wt % for TiO$_2$-decorated graphene at room temperature.

Furthermore, most of the theoretical and experimental work has focused on improving the gravimetric H$_2$ storage capacity of graphene, but paid little attention to volumetric storage capacity that is also a key parameter for H$_2$ adsorbents. Graphene is often produced via a route involving liquid-phase oxidation and subsequent reduction/exfoliation of graphite. The as-prepared graphene is usually fluffy, light powder with loosely packed, curved graphene sheets. The curved structure of graphene sheets causes a very low packing density (to our best knowledge, less than 0.10 g/cm$^3$ in measured tapped density), which would inevitably result in a low volumetric adsorption capacity (amount of gas stored per unit volume of the absorbent material).

Hence, an object of the present disclosure is to provide a material composition that has a higher hydrogen storage capacity. Such a composition can be used in a safe, reliable, and simple hydrogen storage and supply system that is capable of feeding hydrogen fuel to a power-generating device such as a hydrogen combustion engine or fuel cell.

Another object of the present disclosure is to provide a hydrogen storage and supply material that is particularly suitable for feeding hydrogen fuel to fuel cells for use in apparatus such as portable electronic devices, automobiles and unmanned aerial vehicles (UAV) where device weight is a major concern.

Still another object of the present disclosure is to provide a material composition for storing a wide variety of gaseous species, including hydrogen, oxygen, nitrogen, sulfur, sulfur oxide, sulfur nitride, halogen, methane or natural gas, or an organic vapor.

SUMMARY

The present disclosure provides a powder mass of multiple porous graphene balls, wherein at least one of the porous graphene balls comprises multiple graphene sheets having a catalyst, in a form of nanoparticles or coating having a diameter or thickness from 0.3 nm to 10 nm, bonded to or supported by graphene sheet surfaces, wherein the porous graphene balls have a diameter from 100 nm to 100 μm, a physical density from 0.01 to 1.7 g/cm$^3$, and a specific surface area from 50 to 3,000 m$^2$/g and wherein the catalyst is in an amount from 0.01% to 50% by weight (preferably 0.1% to 20%, and further preferably 0.5% to 10%) of the total graphene ball weight. Preferably, a majority or all of these multiple porous graphene balls have these recited features.

In certain embodiments, the multiple graphene sheets have an inter-plane spacing $d_{002}$ from 0.3354 nm to 0.36 nm as measured by X-ray diffraction. In some embodiments, the porous graphene balls have a density from 0.1 to 1.5 g/cm$^3$, and a specific surface area from 200 to 2,630 m$^2$/g. In certain preferred embodiments, the multiple porous graphene balls have a tapped density from 0.3 g/cm$^3$ to 1.3 g/cm$^3$. Preferably, the multiple porous graphene balls have a tapped density from 0.5 g/cm$^3$ to 1.3 g/cm$^3$. Most preferably, the multiple porous graphene balls have a tapped density from 0.6 g/cm$^3$ to 1.3 g/cm$^3$. The measurement methods for tapped density are well-known in the art.

The catalyst may be selected from an alkali metal, an alkaline earth metal, a transition metal, Al, B, or a hydride, oxide, hydroxide, nitride, carbide, or boride of a transition metal, an alkali metal, an alkaline earth metal, or a combination thereof.

The disclosure also provides a gas storage device containing the powder mass described above as a gas-absorbing, gas-adsorbing, gas-capturing, or gas-storing medium to store a gas species therein. The gas species may contain a gas selected from hydrogen, oxygen, nitrogen, sulfur, sulfur oxide, sulfur nitride, halogen, methane or natural gas, or an organic vapor.

The disclosure also provides a method of producing the powder mass described above, the method comprising: (a) providing a suspension of multiple graphene sheets dispersed in a liquid medium wherein a catalyst or a catalyst precursor is dispersed or dissolved in the liquid medium or wherein the catalyst is pre-deposited on surfaces of the graphene sheets in a form of nanoparticles or coating; and (b) dispensing the suspension into multiple micro-droplets (typically from 200 nm to 200 μm in diameter) and thermally or chemically converting the micro-droplets into said mass of porous graphene balls.

In certain embodiments, the graphene sheets are selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In some embodiments, step (a) comprises a procedure selected from fluidized bed drying, rotary drying, cabinet tray drying, tunnel drying, conveyor drying, pneumatic drying, or spray drying.

In certain embodiments, step (b) comprises a procedure of thermally or chemically converting the catalyst precursor to catalyst nanoparticles or coating that are bonded to or supported by graphene sheet surfaces.

In some embodiments, the catalyst precursor is selected from a metal salt that is soluble in the liquid medium.

Preferably, the catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

In the method, the procedure of thermally or chemically converting the micro-droplets into the mass of porous graphene balls may comprise removing the liquid medium from the micro-droplets.

In some embodiments, the catalyst is pre-deposited on surfaces of the graphene sheets in a form of nanoparticles or coating by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

The disclosure further provides a method of producing the powder mass described above, the method comprising: (A) providing a suspension of multiple graphene sheets dispersed in a liquid medium; (B) dispensing the suspension into multiple micro-droplets and removing the liquid from the micro-droplets to form porous micro-droplets comprising multiple graphene sheets and pores; and (C) impregnating the pores with a catalyst or a catalyst precursor and thermally or chemically converting the catalyst precursor to the catalyst to obtain the multiple porous graphene balls. The graphene sheets may be selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In certain embodiments, step (C) comprises a procedure of thermally or chemically converting the catalyst precursor to catalyst nanoparticles or coating that are bonded to or supported by graphene sheet surfaces.

The catalyst precursor is preferably selected from a metal salt that is soluble in said liquid medium. In some embodiments, the catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

In some embodiments, step (C) comprises a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

In some embodiments, step (A) comprises a procedure selected from fluidized bed drying, rotary drying, cabinet tray drying, tunnel drying, conveyor drying, pneumatic drying, or spray drying.

DESCRIPTION OF THE PREFERRED EMBODIMENTS

Figure 2:
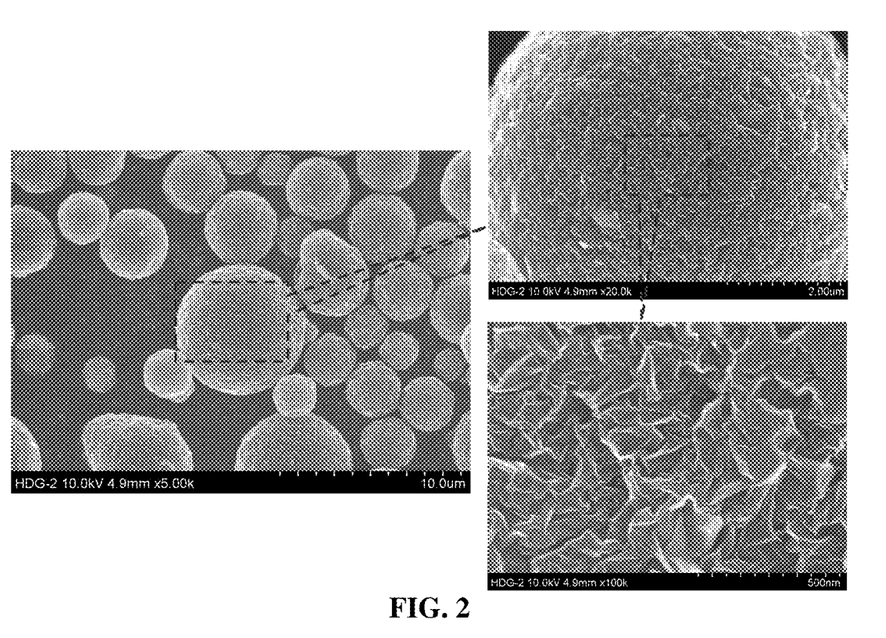
FIG. 2 SEM images of porous graphene balls.

The disclosure provides a powder mass of multiple porous graphene balls that comprise both graphene sheets and catalyst coating or nanoparticles decorated on graphene surfaces. The porous graphene ball comprises multiple graphene sheets having a catalyst, in a form of nanoparticles or coating having a diameter or thickness from 0.3 nm to 10 nm, bonded to or supported by graphene sheet surfaces, wherein the porous graphene balls have a diameter from 100 nm to 100 µm, a physical density from 0.01 to 1.7 g/cm$^3$, and a specific surface area from 50 to 3,000 m$^2$/g and wherein the catalyst is in an amount from 0.01% to 50% by weight (preferably 0.1% to 20%, and further preferably 0.5% to 10%) of the total graphene ball weight. Preferably, a majority or all of these multiple porous graphene balls have these recited features. Shown in FIG. 2 are SEM images of a porous graphene ball.

Figure 3:
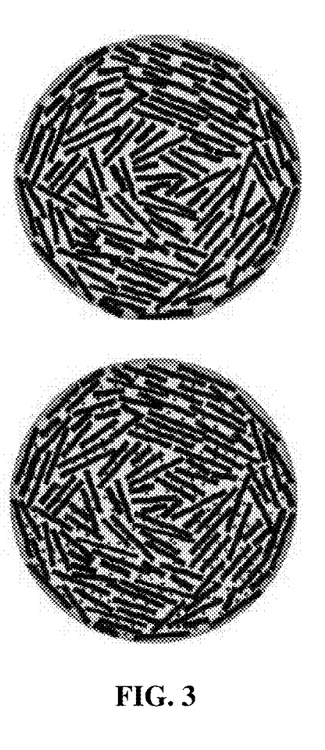
FIG. 3 Schematic of the internal structure of a porous graphene ball without a catalyst (upper drawing) and that with a catalyst (lower drawing).

As schematically illustrated in FIG. 3, inside the porous graphene balls, the graphene sheets preferably have an inter-plane spacing $d_{002}$ from 0.3354 nm to 0.36 nm as measured by X-ray diffraction. In some embodiments, the porous graphene balls have a density from 0.1 to 1.5 g/cm$^3$, and a specific surface area from 200 to 2,630 m$^2$/g. In certain preferred embodiments, the multiple porous graphene balls have a tapped density from 0.3 g/cm$^3$ to 1.3 g/cm$^3$. Preferably, the multiple porous graphene balls have a tapped density from 0.5 g/cm$^3$ to 1.3 g/cm$^3$. Most preferably, the multiple porous graphene balls have a tapped density from 0.6 g/cm$^3$ to 1.3 g/cm$^3$. The measurement methods for tapped density are well-known in the art.

The catalyst may be selected from an alkali metal, an alkaline earth metal, a transition metal, Al, B, or a hydride, oxide, hydroxide, nitride, carbide, or boride of a transition metal, an alkali metal, an alkaline earth metal, or a combination thereof. The presence of a catalyst on graphene surfaces inside a porous graphene ball was found to significantly increase the capacity of gas species storage of the graphene-based materials.

The disclosure also provides a gas storage device containing the powder mass described above as a gas-absorbing, gas-adsorbing, gas-capturing, or gas-storing medium to store a gas species therein. The gas species may contain a gas selected from hydrogen, oxygen, nitrogen, sulfur, sulfur oxide, sulfur nitride, halogen, methane or natural gas, or an organic vapor.

Figure 4:
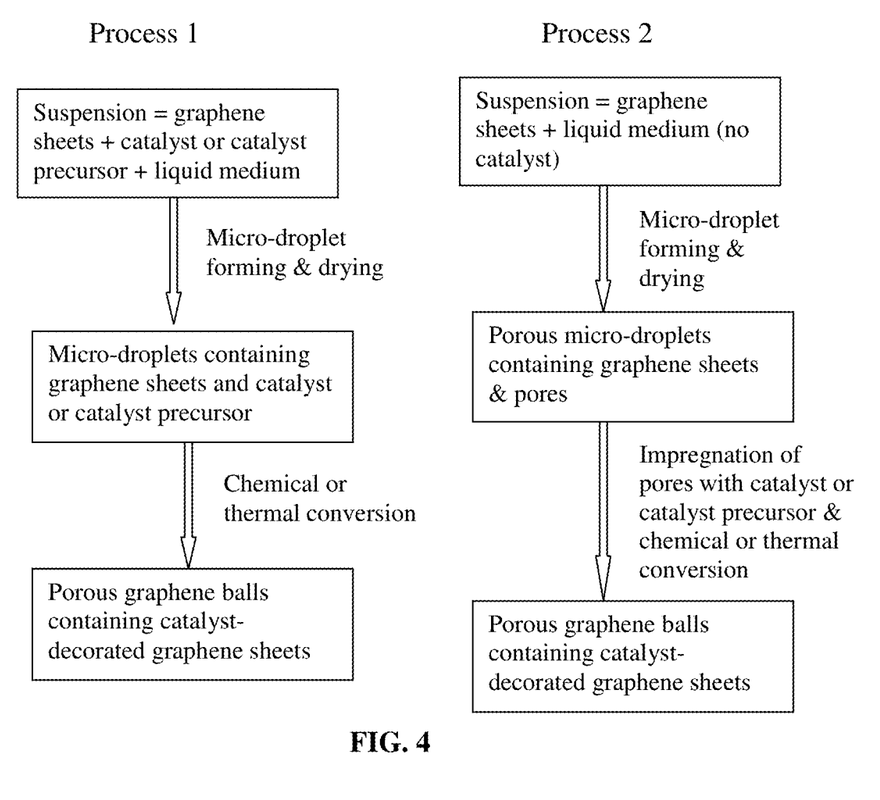
FIG. 4 Flow charts illustrating two processes that can be used to produce the porous graphene balls for gas storage.

Also provided is a method of producing the powder mass described above. As illustrated in Process 1 of FIG. 4, the method comprises: (a) providing a suspension of multiple graphene sheets dispersed in a liquid medium wherein a catalyst or a catalyst precursor is dispersed or dissolved in the liquid medium or wherein the catalyst is pre-deposited on surfaces of the graphene sheets in a form of nanoparticles or coating; and (b) dispensing the suspension into multiple micro-droplets (typically from 200 nm to 200 µm in diameter) and thermally or chemically converting the micro-droplets into said mass of porous graphene balls.

The preparation of graphene suspension for step (a) may be described as follows:

Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Figure 1:
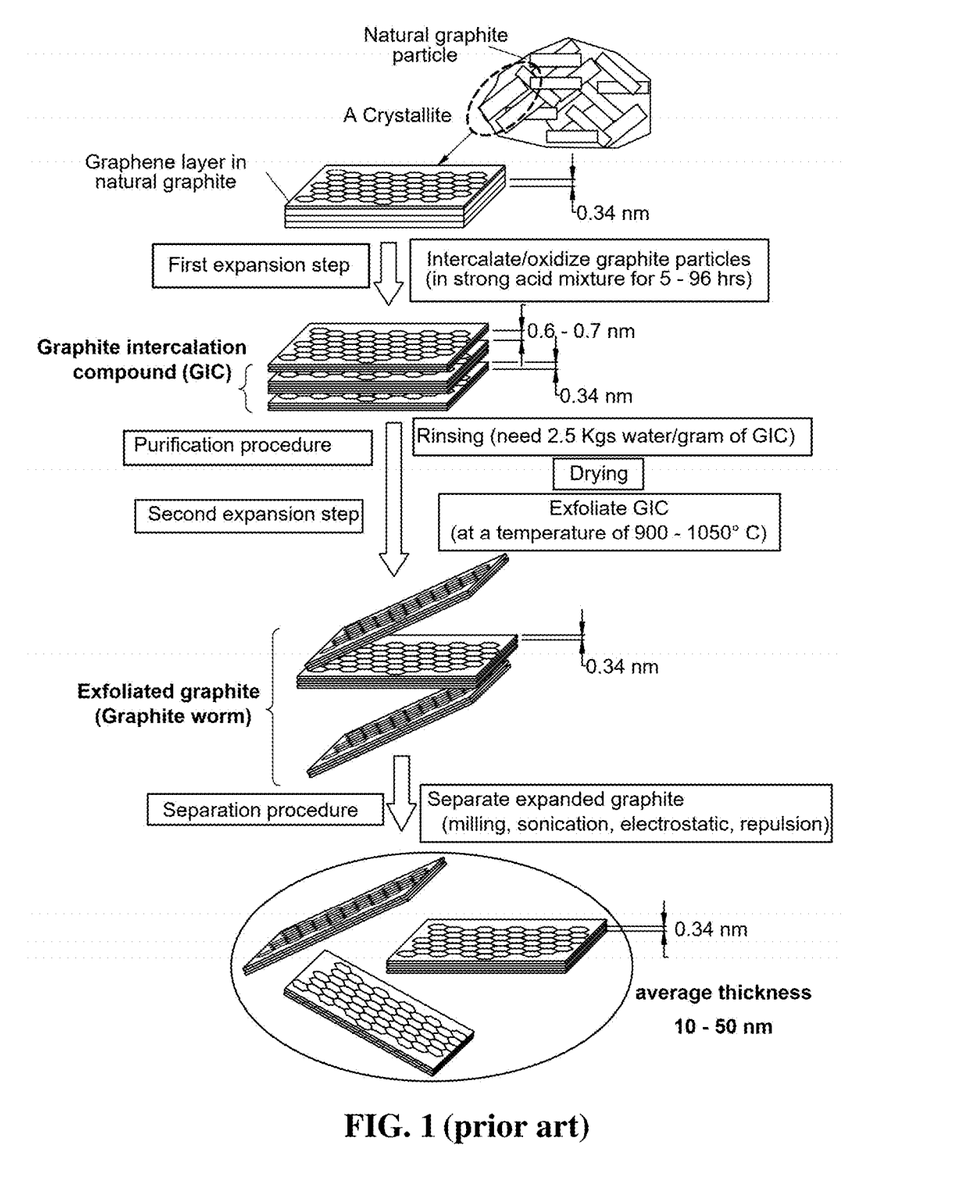
FIG. 1 A flow chart showing the most commonly used prior art process of producing highly oxidized NGPs that entails tedious chemical oxidation/intercalation, rinsing, and high-temperature exfoliation procedures.

A commonly used approach (FIG. 1) of producing graphene sheets entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultra-sonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

The suspension containing graphene sheets (e.g. GO or RGO) dispersed in water or another type of liquid medium (e.g. organic solvent) may be used to produce porous graphene balls using, for instance, spray drying.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon foam can contain pristine or non-pristine graphene and the invented method allows for this flexibility.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For use in the graphene suspension, the graphene sheets may be selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In step (a) of the invented method, the graphene suspension may contain, as an example, graphene oxide (GO) sheets dispersed in a liquid medium (e.g. water). A precursor to the catalyst (e.g. titanium nitrate) may also be dissolved in the liquid medium. When the GO-containing droplets are formed and dried in step (b), these droplets contain titanium nitrate coated on GO sheet surfaces. By heating the droplets (e.g. to 350-700° C.), titanium nitrate is thermally converted to Ti and, concurrently, GO is thermally reduced to RGO; thus, we obtain porous graphene balls having graphene sheets decorated with Ti nanoparticles.

In certain embodiments, step (b) of this invented method comprises a procedure of thermally or chemically converting the catalyst precursor to catalyst nanoparticles or coating that are bonded to or supported by graphene sheet surfaces.

In some embodiments, the catalyst precursor is selected from a metal salt that is soluble in the liquid medium. Preferably, the catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

In the method, the procedure of thermally or chemically converting the micro-droplets into the mass of porous graphene balls may comprise removing the liquid medium from the micro-droplets.

In some embodiments, prior to step (a), the catalyst may be pre-deposited on surfaces of the graphene sheets in a form of nanoparticles or coating by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

In certain alternative embodiments, the graphene suspension does not contain a catalyst or catalyst precursor. The catalyst or precursor to catalyst may be introduced later after the porous graphene ball structure is made. Thus, as illustrated in Process 2 of FIG. 4, the disclosure further provides a method of producing the powder mass described above, the method comprising: (A) providing a suspension of multiple graphene sheets dispersed in a liquid medium; (B) dispensing the suspension into multiple micro-droplets and removing the liquid from the micro-droplets to form porous micro-droplets comprising multiple graphene sheets and pores; and (C) impregnating the pores with a catalyst or a catalyst precursor and thermally or chemically converting the catalyst precursor to the catalyst to obtain the multiple porous graphene balls. The graphene sheets may be selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In some embodiments, the presently invented high-density graphene (HDG), or called micrographene bead (MGB), is produced from graphene oxide (GO) by three unit operations, including chemical reduction, drying/grinding, and thermal treatment. Some examples of the conditions of each unit operation are described below:

The chemical reduction of a GO (0.01~10 wt %) solution may be carried out at 10~100° C. under stirring for 0.1~24 hours by using a reducing agent that includes, but is not limit to, hydrogen sulfide, sodium borohydride, alkaline solutions, hydrazine, hydrohalic acids, ascorbic acid, sodium citrate, plant extracts, sugars, micro-organisms, and/or amino acids. The ratio of reducing agent to GO in weight may range from 0.1 to 50.

The drying of the reduced GO (rGO, 0.01~10 wt %) slurry may be conducted on an industrial drying equipment that includes, but is not limit to, fluidized bed dryer, rotary dryer, cabinet tray dryer, tunnel dryer, conveyor dryers, pneumatic dryer, and spray dryer. The dried rGO is ground into fine powder by using a ball-milling machine, followed by being sieved to have a particle size of 1~50 μm in $D_{50}$ along with a spherical morphology.

The thermal treatment of the rGO powder may be carried out at 200~1000° C. for 0.1~24 h in a $N_2$, Ar, $H_2/N_2$, or $H_2$/Ar flow.

In certain embodiments, step (C) comprises a procedure of thermally or chemically converting the catalyst precursor to catalyst nanoparticles or coating that are bonded to or supported by graphene sheet surfaces.

The catalyst precursor is preferably selected from a metal salt that is soluble in said liquid medium. In some embodiments, the catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

In some embodiments, step (C) comprises a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

The following examples are used to illustrate some specific details about the best modes of practicing the instant disclosure and should not be construed as limiting the scope of the disclosure.

Example 1: Preparation of Single-Layer Graphene Sheets from Mesocarbon Microbeads (MCMBs) and Porous Graphene Balls Mesocarbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions.

TEM and atomic force microscopic studies of small amounts of dried graphene powder indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

A controlled amount of nickel acetate was added to a GO suspension (containing GO sheets suspended in water) to form a mixture suspension. The mixture suspension was then spray-dried to form graphene micro-droplets (5-26 μm in diameter) containing nickel acetate residing between graphene oxide sheets. The powder mass of these micro-droplets was then subjected to a heat treatment (350° C. for 1 hour and 700° C. for 1 hour) in a $N_2/H_2$ atmosphere to produce porous graphene balls having reduced graphene oxide (RGO) sheets decorated with Ni nanoparticles having a diameter from 0.5 to 3.5 nm. This heat treatment serves two functions: converting nickel acetate to Ni metal nanoparticles and reducing GO to RGO (reducing oxygen content from >35% to <5% by weight.

Example 2: Preparation of Porous Pristine Graphene Balls (Essentially 0% Oxygen)

Pristine graphene sheets were produced by using the direct ultrasonication or liquid-phase production process. In a representative procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements.

Sputtering was used for deposition of metal catalyst (e.g. Ni, Ag, and Ag) onto surfaces of graphene sheets. The graphene sheets were re-dispersed in the water solution to form a suspension, which was then spray-dried to form porous graphene balls comprising catalyst-decorated graphene sheets therein.

Example 3: Preparation of Graphene Oxide (GO) Suspension from Natural Graphite and Subsequent Preparation of Graphene Balls (rGO Balls)

Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. Two separate processes were then followed to produce the porous graphene balls containing pores and catalyst-decorated graphene sheets.

One process included dissolving a catalyst precursor (e.g. a mixture of nickel nitrate and aluminum nitrate) into a GO-water suspension, dispensing and forming the suspension into micro-droplets (e.g. using spray-drying or fluidized bed drying), and then thermally converting the micro-droplets into the desired porous graphene balls. The heat treatments concurrently convert nickel nitrate and aluminum nitrate into Ni/Al alloy and reduce GO into RGO.

The other process included dispensing the GO-water suspension (without a catalyst or catalyst precursor) to form porous GO balls (e.g. using spray-drying), which were then impregnated with a catalyst precursor. The resulting catalyst precursor-impregnated GO balls were then thermally converted into porous graphene balls containing catalyst-decorated graphene sheets (RGO sheets).

Examples 4: Preparation of Graphene Oxide Balls from Chemical Reduction

A mixture of graphene oxide (0.01 wt. %) and de-ionized water (DI $H_2O$, 99.0 wt. %) in a total amount of 14 kg was stirred for 16 h to obtain a homogeneous solution, which was then transferred to a jacketed glass reactor (20 L) equipped with a stirring propeller and an oil circulator/heater. After addition of 14 g sodium borohydride, the GO solution was heated to 50° C. under stirring, and the temperature was maintained at 50° C. for additional 1 h to make the GO reduced.

The reduced GO (rGO) slurry was discharged from the chemical reactor and then transferred to a rotary drum dryer for drying. The dryer was operated at 120° C. The dried rGO was then ground into fine powder by using a ball-milling machine, followed by being sieved to have a particle size of 6 µm in $D_{50}$.

The obtained rGO powder was thermally treated at 900° C. for 3 h in an Ar flow, resulting in high-density graphene (HDG). The obtained HDG has a spherical morphology with a particle size of 6 µm in $D_{50}$, tapped density of 0.60~0.65 $g/cm^3$, and BET surface area of 450 $m^2/g$.

Examples 5: Preparation of Graphene Fluoride Balls

In a typical procedure, a powder mass of graphene balls, prepared in Example 1, was fluorinated by vapors of chlorine trifluoride in a sealed autoclave reactor to yield fluorinated graphene balls. Different durations of fluorination time were allowed for achieving different degrees of fluorination.

Example 6: Preparation of Graphene Oxide Balls and Nitrogenated Graphene Balls Some GO ball samples (e.g. those prepared in Examples 2 and 3) were mixed with different proportions of urea and the mixtures were heated in a microwave reactor (900 W) for 0.5 to 5 minutes. The products were washed several times with deionized water and vacuum dried. The products obtained were nitrogenated graphene balls. The nitrogen contents were from 3 wt. % to 17 wt. %, as measured by elemental analysis.

Example 7: Characterization of Various Graphene Balls

The internal structures (crystal structure and orientation) of several series of graphene balls were investigated using X-ray diffraction. The X-ray diffraction curve of natural graphite typically exhibits a peak at approximately 2θ=26°, corresponds to an inter-graphene spacing ($d_{002}$) of approximately 0.3345 nm. The graphene sheets in the graphene balls exhibit an inter-graphene spacing typically from 0.40 nm to 15 nm, but more typically from 0.6 nm to 5 nm, according to X-ray, SEM, and TEM examination results.

The specific surface area was measured by the well-known nitrogen adsorption-based BET method. The methods for measuring the physical density and tapped density of particles are also well-known in the art.

We claim:

1. A powder mass of multiple porous graphene balls, wherein at least one of said porous graphene balls comprises multiple graphene sheets having a catalyst, in a form of nanoparticles or coating having a diameter or thickness from 0.3 nm to 10 nm, bonded to or supported by graphene sheet surfaces, wherein said porous graphene balls have a diameter from 100 nm to 100 µm, a physical density from 0.01 to 1.7 $g/cm^3$, and a specific surface area from 50 to 3,000 $m^2/g$ and wherein said catalyst is in an amount from 0.01% to 50% by weight of the total graphene ball weight.

2. The powder mass of claim 1, wherein said multiple graphene sheets have an inter-plane spacing $d_{002}$ from 0.3354 nm to 0.36 nm as measured by X-ray diffraction.

3. The powder mass of claim 1, wherein said porous graphene balls have a density from 0.1 to 1.5 $g/cm^3$, and a specific surface area from 200 to 2,630 $m^2/g$.

4. The powder mass of claim 1, wherein said multiple porous graphene balls have a tapped density from 0.3 $g/cm^3$ to 1.3 $g/cm^3$.

5. The powder mass of claim 1, wherein said multiple porous graphene balls have a tapped density from 0.5 $g/cm^3$ to 1.3 $g/cm^3$.

6. The powder mass of claim 1, wherein said catalyst is selected from an alkali metal, an alkaline earth metal, a transition metal, Al, B, or a hydride, oxide, hydroxide, nitride, carbide, or boride of a transition metal, an alkali metal, an alkaline earth metal, or a combination thereof.

7. The powder mass of claim 1, wherein said multiple porous graphene balls have a tapped density from 0.6 $g/cm^3$ to 1.3 $g/cm^3$.

8. A gas storage device containing the powder mass of claim 1 as a gas-absorbing, gas-adsorbing, gas-capturing, or gas-storing medium to store a gas species therein.

9. The gas storage device of claim 8, wherein said gas species is selected from hydrogen, oxygen, nitrogen, sulfur, sulfur oxide, sulfur nitride, halogen, methane or natural gas, or an organic vapor.

10. A method of producing the powder mass of claim 1, said method comprising:
   a) providing a suspension of multiple graphene sheets dispersed in a liquid medium wherein a catalyst or a catalyst precursor is dispersed or dissolved in said liquid medium or wherein said catalyst is pre-deposited on surfaces of said graphene sheets in a form of nanoparticles or coating; and
   b) dispensing said suspension into multiple micro-droplets and thermally or chemically converting said micro-droplets into said mass of porous graphene balls.

11. The method of claim 10, wherein said graphene sheets are selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

12. The method of claim 10, wherein said step (b) comprises a procedure of thermally or chemically converting said catalyst precursor to catalyst nanoparticles or coating that are bonded to or supported by graphene sheet surfaces.

13. The method of claim 10, wherein said catalyst precursor is selected from a metal salt that is soluble in said liquid medium.

14. The method of claim 10, wherein said catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

15. The method of claim 10, wherein said procedure of thermally or chemically converting said micro-droplets into said mass of porous graphene balls comprises removing said liquid medium from said micro-droplets.

16. The method of claim 10, wherein said catalyst is pre-deposited on surfaces of said graphene sheets in a form of nanoparticles or coating by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

17. A method of producing the powder mass of claim 1, said method comprising:
   A) providing a suspension of multiple graphene sheets dispersed in a liquid medium;
   B) dispensing said suspension into multiple micro-droplets and removing said liquid from said micro-droplets to form porous micro-droplets comprising multiple graphene sheets and pores; and
   C) impregnating said pores with a catalyst or a catalyst precursor and thermally or chemically converting said catalyst precursor to said catalyst to obtain said multiple porous graphene balls.

18. The method of claim 17, wherein said graphene sheets are selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

19. The method of claim 17, wherein said step (C) comprises a procedure of thermally or chemically converting said catalyst precursor to catalyst nanoparticles or coating that are bonded to or supported by graphene sheet surfaces.

20. The method of claim 17, wherein said catalyst precursor is selected from a metal salt that is soluble in said liquid medium.

21. The method of claim 17, wherein said catalyst precursor is selected from a nitrate, acetate, sulfate, phosphate, hydroxide, chloride, bromide, iodide, or carboxylate of a transition metal, an alkali metal, an alkaline earth metal, Al, or a combination thereof.

22. The method of claim 17, wherein said step (C) comprises a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, solution impregnation, melt impregnation, solution deposition, or a combination thereof.

23. The method of claim 17, wherein said step (A) comprises a procedure selected from fluidized bed drying, rotary drying, cabinet tray drying, tunnel drying, conveyor drying, pneumatic drying, or spray drying.

\* \* \* \* \*